May 18, 1926. 1,585,408
S. H. MORSE
MACHINE FOR DEVELOPING, WASHING, AND FINISHING PHOTOGRAPHIC
FILMS AND PRINTS
Filed Oct. 20, 1922 3 Sheets-Sheet 1

Sydney Harold Morse
INVENTOR;
By Otto Munk
his Attorney.

May 18, 1926.

S. H. MORSE 1,585,408

MACHINE FOR DEVELOPING, WASHING, AND FINISHING PHOTOGRAPHIC
FILMS AND PRINTS

Filed Oct. 20, 1924

Sydney Harold Morse
INVENTOR

By *Otto Munk*
his Attorney

May 18, 1926.
S. H. MORSE
1,585,408
MACHINE FOR DEVELOPING, WASHING, AND FINISHING PHOTOGRAPHIC
FILMS AND PRINTS
Filed Oct. 20, 1922    3 Sheets-Sheet 3
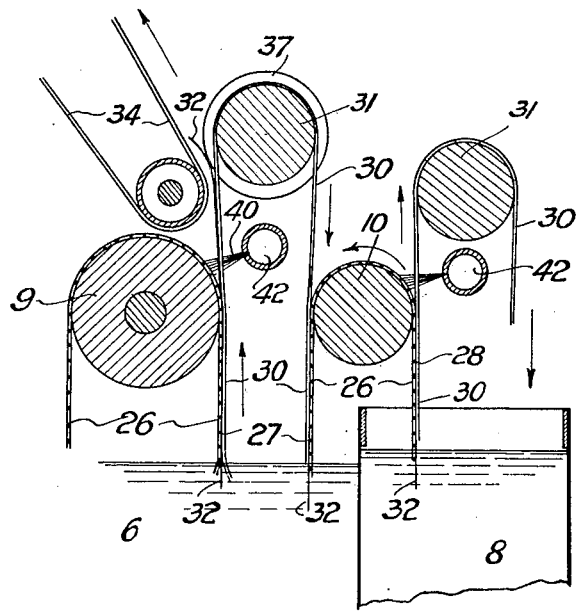
FIG. 3
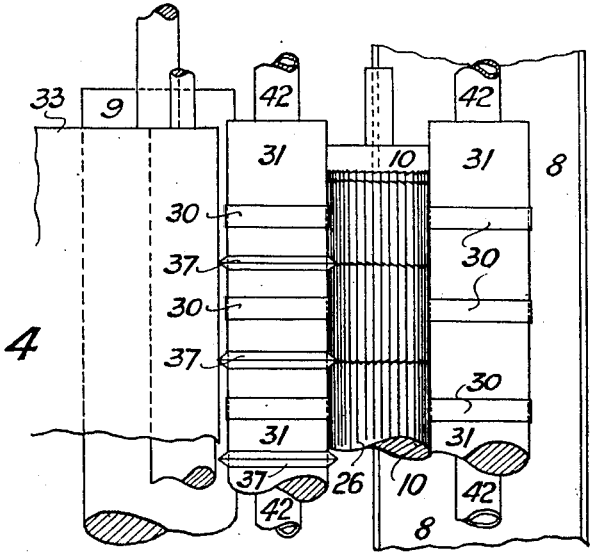
FIG. 4
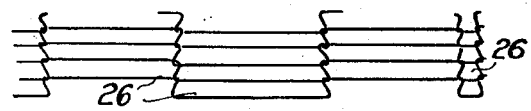
FIG. 6
FIG. 5
Sydney Harold Morse
INVENTOR;
By Otto Munk
his Attorney.

Patented May 18, 1926.

1,585,408

UNITED STATES PATENT OFFICE.

SYDNEY HAROLD MORSE, OF LONDON, ENGLAND.

MACHINE FOR DEVELOPING, WASHING, AND FINISHING PHOTOGRAPHIC FILMS AND PRINTS.

Application filed October 20, 1922. Serial No. 595,736.

This invention relates to developing, washing and finishing machines for photographic films and prints.

The object of the invention is to provide a machine of simple and compact structure which will deal continuously, efficiently, expeditiously, accurately and economically with work of any dimensions within its extreme limits, whether the films or prints are fed singly, consecutively when of a size approximating that of the machine, or collectively and in contiguity when of a size considerably less than that of the machine, and which will ensure an extensive travel of the film or print relatively to the length, width and height of the machine.

To this end, a machine embodying the invention comprises an endless flexible film- or print-conveying member traversable in a sinuous or tortuous course through a container or containers of water, chemicals or other media, means for supporting and operating it, a plurality of single endless film or print positioning members, traversably mounted between the, or some of the, folds or loops of the conveying member, and arranged to be either frictionally actuated thereby or independently.

In operation, the film or print is introduced upon the conveying member which transports it through the sinuous course followed thereby, during which it is in contact with the positioning member or members which functions or function to retain it in taut condition without ribbing, scoring or defacing.

The invention will now be fully described with reference to the accompanying drawings which illustrate, by way of example, a machine for dealing with blue or like prints. These drawings only represent as much of the machine as is necessary for elucidation; and of the respective figures thereof:—

Fig. 2 is a corresponding fragmentary broken front elevation.

Fig. 3 is a fragmentary transverse sectional elevation showing some of the components included in the preceding figures, on an enlarged scale; and Fig. 4 is a corresponding plan.

Fig. 5 is an elevation of a fragment of the main traversable or print-conveying member; and Fig. 6 is a transverse section thereof.

Figure 1:
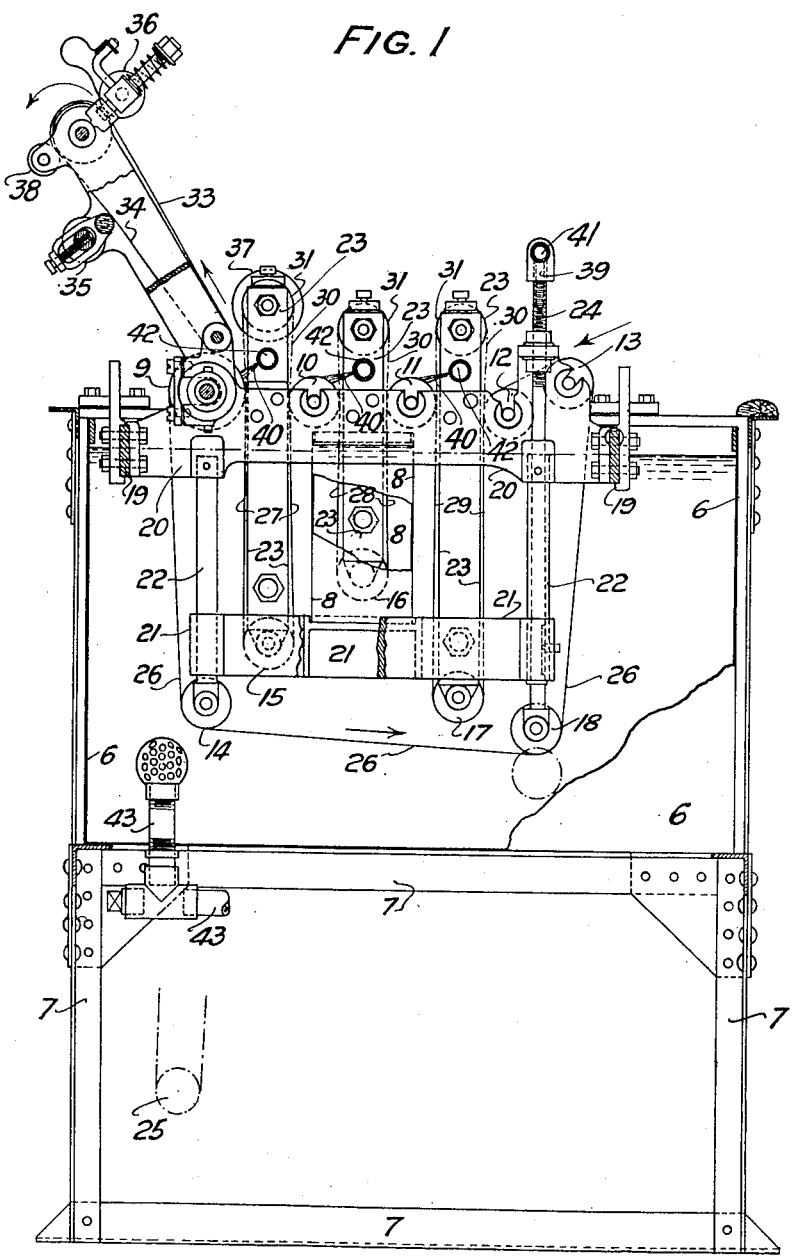
Fig. 1 is a transverse sectional elevation.

Referring to the several figures, where applicable, 6 denotes a container in the form of a tank supported upon a base 7, these two elements carrying the remainder of the components of the machine. The purpose of the tank 6 is to receive water which is supplied, circulated and discharged in any appropriate way known in connection with analogous machines, or as will be explained subsequently.

Within the tank 6, intermediate of its width and height and co-extensive with its length, a relatively small container or tank 8 is situated, its object being to hold any required chemical or chemicals in solution or otherwise.

Two sets of rollers—an upper series 9, 10, 11, 12 and 13, and a lower series 14, 15, 16, 17 and 18—are positioned longitudinally more or less within the tanks 6 and 8 in vertical and transverse spaced relation. These rollers are mounted in a known manner on a structure comprising bearers, brackets and pillars 19, 20, 21, 22 and 23, and so that one or more may be adjustable vertically; the roller 18 of the lower set is shown so adapted by screw-and-nut means 24, and as indicated by the dot-and-dash lines in Fig. 1. The roller 9 of the upper set is, as represented, driven by a chain and sprocket mechanism 25 from any convenient prime mover, and constitutes the driving element of the sets of rollers. If desired, the roller 13 or any other may also be positively driven.

The function of the two sets of rollers 9, 10, 11, 12 and 13, and 14, 15, 16, 17 and 18 is to support and traverse an endless member 26 which, starting from the roller 9, is led therefrom to and over the roller 14, thence to and over the rollers 18 and 13, whence it passes in turn to and over the rollers 12, 17, 11, 16, 10, 15 back to the roller 9, its operation being effected from the driving roller 9, and its tension being maintained by the adjustable roller 18. By this arrangement it will be seen, chiefly from an inspection of Fig. 1, that the member 26 is constrained to follow a zigzag path in its passage through the tanks 6 and 8, and that three folds or loops 27, 28 and 29 accrue, of which one, 28, obtains within the tank 8 and is subject to the contents thereof, whilst the others and the rest of the member 26 are exposed to the contents of the tank 6. The office of this member 26 is to receive and convey the print from the place of feed to the place of delivery of the machine, such places being, respectively, adjacent the rollers 13 and 9.

Preferably, the conveyor member 26 is of a single width of woven or built-up metallic mesh or wire-strip fabric of the kind illustrated in Figs. 5 and 6; this presents the requisite flexibility and facility for draining the liquids picked up from the tanks 6 and 8. The member 26 may, of course, be otherwise constituted.

Within each of the folds or loops 27, 28 and 29 of the print-conveying member 26 a plurality of traversable narrow endless members 30—30 are mounted on pairs of rollers. Suitably, as shown best in Figs. 2, 3 and 4, these members 30—30 are in the form of tapes of textile fabric. Therefore, there are three sets of the members 30—30; they are associated with the rollers 15, 16 and 17 of the lower series supporting the member 26, one set with the roller 15, another with the roller 16, and the other with the roller 17. Thus each roller 15, 16 and 17 constitutes one of a pair of the supporting rollers, the complementary roller 31 being mounted in alignment therewith on the aforesaid structure-component 23. Consequently, the rollers 15, 16 and 17 accomplish a dual purpose inasmuch as they are common to the members 26 and 30—30, of which the latter are disposed directly upon the rollers and are thereby driven by them and hence the rollers 31—31 indirectly. The object of these members 30—30 is to bear upon the prints translated by the conveying member 26 and, in this way, maintain their position and taut condition thereon as will be evident from Fig. 3 where 32 denotes a print interposed between the members 26 and 30—30 and being jointly transported by them.

Obviously, if desired, one or more of the rollers 31—31 may be positively driven. Again, the rollers 15, 16 and 17 may be substituted by independent rollers.

Adjacent the driving and delivery roller 9 of the conveying member 26 is a table 33 (which may be adjustable in known manner, radially or otherwise) fitted with an endless conveyor 34 furnished with tightening means 35, and a squeegee-roller device 36, all of ordinary type. Their joint purpose is to receive and transfer the prints 32—32 from the conveying member 26 at the roller 9, remove the surface water, and deliver them for drying or other further treatment. To ensure a free and effective delivery to the table 34, it is advantageous to furnish on the immediate preceding roller 31 of the members 30—30 a series of spaced V-edged rings 37—37 of rigid or pliable material such as metal or rubber, which exert a releasing effort. It is also beneficial to provide, as shown in Fig. 1, a roller 38 at the top of the table 33 for directing the prints away from it.

Further, to ensure the smooth and regular travel of the prints 32, 32, water is supplied in jets, the apparatus therefor being positioned in proximity to the conveying member 26 and the positioning members 30—30. As exemplified in Figs. 1 and 2, vertical and radial jets 39 and 40 are provided, the water being conveyed from the source of supply to longitudinally-disposed pipes 41 and 42.

Appropriately, the pipe 41 is, or is in connection with, the main water-service pipe, and assuming the tank 6 is empty or requires replenishing the control tap or valve of the pipe is opened whereupon the tank 6 is filled to the extent required and the valve or tap then closed. The water supplied to the tank 6 in this way is transferred through suitably controlled fittings to the pipes 41 and 42 for use at the jets 39 and 40 and eventual return to the tank by a pump connected to the fitting 43 represented in Fig. 1. Thus the water is supplied and circulated relatively to the tank 6. and, of course, overflow and discharge are provided for by usual arrangements.

The tank 8 is filled and emptied in any convenient manner.

The operation of the machine as a whole will be self-evident from the foregoing, but it is convenient to summarize it thus:

Supposing the roller 9 is revolving under the influence of the driving mechanism 25, then the conveying member 26 is traversed and likewise the positioning members 30—30. Now, assuming a print 32 is introduced to the conveyor member 26 at the roller 13, it is carried thereby into the tank 6, thence into and from the tank 8, whence it re-enters the tank 6 and is eventually delivered to the table 33 for further treatment, the members 30—30 meanwhile operating to preserve position and condition. Thus, in comparison with the distance apart of the feed and delivery places 13 and 9 of the machine, the print 32 travels a considerable distance with the consequential advantages in the way of developing, washing, and so forth. As soon as one print has cleared the feeding place 13, another may be introduced, and where the dimensions of the prints are small relatively to the length of the machine, a plurality may be introduced simultaneously or in rapid succession. Therefore, as the machine works continuously the output is extensive, but despite this the efficiency of the work is not impaired, and "spoils" are infrequent.

Should the content mentioned in connection with the tank 8 not be required, it may be removed and replaced by water.

From the foregoing, it will be manifest that a machine embodying the invention is capable of various modifications without affecting the essentials set forth. For instance, instead of the members 26 and 30—30 being disposed in the vertical sense, they may be arranged horizontally or diagonally; the number of folds or loops 27, 28 and 29 may be increased or decreased; and the tank 8 may be dispensed with, or another or others added for holding any required medium or media. Again, the detail constructions explained or illustrated may be varied to meet particular requirements in the way of service or design. Also, accessories, necessary for the proper working of the machine, will be associated with the described apparatus as and where required as will be apparent to those skilled in the art to which the invention relates, their kind being selected to best suit the destined use.

What I claim and desire to secure by Letters Patent is:—

1. In a machine of the kind described, a film-conveyor comprising a single endless flexible conveying-member constrained to follow a sinuous course throughout the machine, and a plurality of independent endless flexible positioning-members assembled as a set separately located and traversably mounted in at least one of the folds of said conveying-member.

2. In a machine of the kind described, a film-conveyor comprising a single endless flexible conveying-member constrained to follow a sinuous course throughout the machine, a plurality of independent flexible positioning-members consisting of narrow bands assembled as a set separately located and traversably mounted in at least one of the folds of said conveying-member, rollers supporting and operating said conveying-member and said set of positioning-members, and means for driving at least one of said rollers.

3. A machine of the character described comprising a main tank, a secondary tank, an endless flexible conveying member constrained to follow a sinuous course throughout the machine, said conveying member passing through said main tank and said secondary tank, and a plurality of endless flexible positioning members traversably mounted in at least one of the folds of said conveying member.

4. A machine of the character described comprising a main tank, a secondary tank within said main tank, an endless flexible conveying member constrained to follow a sinuous course throughout the machine, said conveying member being so arranged that at least one of the folds thereof extends into said secondary tank, and an endless flexible positioning member traversably mounted in each fold of said conveying member.

5. A machine of the character described comprising a main tank, a secondary tank, an endless flexible conveying member constrained to follow a sinuous course throughout the machine, said conveying member being so arranged that at least one of the folds thereof extends into said secondary tank, and an endless flexible positioning member traversably mounted in each fold of said conveying member.

In testimony whereof I affix my signature.

SYDNEY HAROLD MORSE.